United States Patent [19]

Izawa et al.

[11] Patent Number: 5,317,704
[45] Date of Patent: May 31, 1994

[54] STORAGE RELOCATING METHOD AND HIERARCHY STORAGE SYSTEM UTILIZING A CACHE MEMORY

[75] Inventors: Satoshi Izawa; Masaya Watanabe, both of Hadano; Seiji Kaneko, Yokohama, all of Japan

[73] Assignees: Hitachi, Ltd., Kodaira; Hitachi Microcomputer Engineering, Ltd., Tokyo, both of Japan

[21] Appl. No.: 553,699

[22] Filed: Jul. 18, 1990

[30] Foreign Application Priority Data

Jul. 18, 1989 [JP] Japan .................. 1-185749

[51] Int. Cl.[5] .................. G06F 12/10
[52] U.S. Cl. .................. 395/400; 364/DIG. 1; 364/256.3; 364/243.4; 364/964.2; 364/964.25
[58] Field of Search ... 364/200 MS File, 900 MS File; 395/425

[56] References Cited

U.S. PATENT DOCUMENTS

| | | | |
|---|---|---|---|
| 4,612,612 | 9/1986 | Woffinden et al. | 395/400 |
| 4,638,426 | 1/1987 | Chang et al. | 395/400 |
| 4,680,700 | 7/1987 | Hester et al. | 395/400 |
| 4,719,568 | 1/1988 | Carrubba et al. | 395/425 |
| 4,860,192 | 8/1989 | Sachs et al. | 395/400 |
| 4,885,680 | 12/1989 | Anthony et al. | 395/425 |
| 4,928,239 | 5/1990 | Baum et al. | 395/425 |
| 4,991,088 | 2/1991 | Kam | 395/425 |
| 5,067,078 | 11/1991 | Talgam et al. | 395/425 |
| 5,131,087 | 7/1992 | Warr | 395/425 |

FOREIGN PATENT DOCUMENTS

3832912A1 3/1989 Fed. Rep. of Germany .
62-290550 12/1986 Japan .
63-21222 5/1988 Japan .

Primary Examiner—Glenn Gossage
Assistant Examiner—Matthew M. Kim
Attorney, Agent, or Firm—Antonelli, Terry, Stout & Kraus

[57] ABSTRACT

A method and apparatus for relocating a storage such that a physical address area of the storage, which is allocated to an absolute address area, is replaced with a new physical address area. This relocation process is performed with a Floating Address Register for translating an absolute address into a physical address in a hierarchy storage system including a main storage and a store-in cache memory, thereby reducing a stopping time of the main storage during the relocation process. According to the method, data of the area of object physical addresses to be relocated is fetched into a block of the cache memory, and then the new physical addresses of the storage are allocated to the absolute address to which the old physical addresses have been allocated.

1 Claim, 10 Drawing Sheets

STORAGE RELOCATING METHOD AND HIERARCHY STORAGE SYSTEM UTILIZING A CACHE MEMORY

BACKGROUND OF THE INVENTION

1. Field of the Invention

This invention relates to a storage for a computer, for example, and more particularly to the relocation of data stored in the storage.

2. Related Arts

Many existing large computers are equipped with a translation table called FAR (Floating Address Register) for translating an absolute address into a physical address and are able to allocate every predetermined split unit of an absolute address space to an arbitrary physical memory element. This feature is useful, for example, for maintenance of memory units. In general, the FAR can be modified only while a system is not operating.

Heretofore, when intending to modify a FAR while the system is operating, the following procedures would be necessary for preventing any misoperation. Firstly, access to a storage is temporarily stopped. Then physical addresses are modified and storage data is transferred from old physical addresses to new physical addresses, whereupon access to the storage is restarted.

Such prior technology is exemplified by Japanese Patent Publication No. 21222/1988. The operational principles of a store-in cache described above are conventional and is described in, for example, Japanese Patent Laid-Open Publication No. 290550/1986.

With the foregoing prior art, during moving of the stored data with modification of the physical addresses, it is necessary to stop access to the storage. During that time, therefore, the operation of an apparatus utilizing the storage would be stopped.

A problem with some kinds of apparatuses is that the response speed of the storage would be lowered due to this stopping.

SUMMARY OF THE INVENTION

It is therefore an object of this invention to provide a storage relocating method and a hierarchy storage system which reduces a stopping time of a storage while the storage is relocated, minimizing any reduction of the response speed.

Another object of the invention is to provide a storage relocating method for a hierarchy storage system which enables relocation of a main storage, while a system is operating, through rewriting of a FAR.

According to a first aspect of the invention, there is provided a method of relocating a storage, to which a physical address is given, in a storage system including the storage, a cache memory managed by an absolute address for holding a copy of a part of the storage, address translation register for associating the absolute address with a physical address, the method comprising: fetching into the cache memory the content of a physical area of the storage associated with an object absolute address area to be relocated; translating after the fetching, association of the address translating register such that the absolute address area is associated with a new physical address area; and then writing the content, which has been fetched in the cache memory, back to the new physical address area which is newly associated with said absolute address area, irrespective of whether or not the content has been changed.

According to a second aspect of the invention, there is provided a method of relocating a storage by utilizing a store-in cache memory for holding a copy of the content of the storage, and an address translation register for associating an absolute address with a physical address, the method comprising: fetching into a block of the cache memory the content of a source storage to be relocated; holding, after the fetching, information indicating that the content of the block of the cache memory is different from the content of the storage; and modifying address association of the address translation register such that an absolute address associated with a physical address of said source area is associated with a physical address of a destination area of the storage to be relocated.

According to a third aspect of the invention, there is provided a method of relocating a storage, while a storage system is operating, by utilizing a store-in cache memory for holding a copy of the content of the storage, and an address translation means for associating an absolute address with a physical address, the method comprising: fetching data out of a source area in the storage, which is to be relocated, into the cache memory in response to a relocation request from a host apparatus; and modifying address association of the address translation means such that the fetched storage data is written back to a destination area in the storage.

According to a fourth aspect of the invention, there is provided a hierarchy storage system comprising: a storage; a store-in cache memory for holding a copy of the content of the storage in plural blocks thereof; an address translation register for associating an absolute address with a physical address; means for providing a relocation request, in addition to a fetch request and a store request, to the storage, for fetching data of a source area in the storage, which is to be relocated, into one block of the cache memory and for turning a change bit of the block to a changed state; and means for modifying address association of the address translation register such that the fetched storage data is written back to a destination area in the storage.

According to a fifth aspect of the invention, there is provided a hierarchy storage system comprising: a storage; an address translation register for associating an absolute address and a physical address with each other for every predetermined split storage unit; a store-in cache memory including a data array composed of plural blocks for storing a part of the data stored in the storage, and a change bit array for storing change bits, each indicating that data stored in a block of the data array is different from data of an associated part of the storage; means for reading, from the storage, data of an area of said storage designated by a physical address corresponding to a designated absolute address, for storing the read data in one block of the cache memory, and for turning the content of the change bit array, corresponding to the block, to a state indicating that the data of the block is different from the content of the storage; and means for controlling the address translation register such that the designated absolute address is associated with a physical address of a destination area in the storage to be relocated.

According to a sixth aspect of the invention, there is provided a hierarchy storage system comprising: a storage; an address translation table for associating an absolute address with a physical address for every predetermined split storage unit; a store-in cache memory including a data array composed of plural blocks for storing a part of data stored in the storage, and a change bit array for storing change bits, each indicating that data stored in a block of the data array is different from data of an associated part of the storage, the predetermined split storage unit being larger than a block of the cache memory; a first address holding means for holding physical address information of a destination area in said storage to be relocated; a second address holding means for holding absolute address information of an object split storage unit to be relocated; a third address holding means for holding a boundary absolute address between an unrelocated block and a relocated block; a boundary address updating means for updating one address block of of the third address holding means for every block relocation; a first deciding means for deciding whether or not an absolute address to be accessed is attributed to the object split storage unit to be relocated; a second deciding means for deciding which is larger or smaller between an absolute address to be accessed and the boundary absolute address; selecting means for selecting, according to the decision results of the first and second deciding means, physical address information from the address translation table or from the first address holding means to give the selected one to the storage; and writing means for writing the content of the first address holding means into a corresponding portion of the address translation table after all of the blocks in the split storage unit have been relocated.

Here in this specification, the term "absolute address" is an address which is to be associated with a physical address of a CU storage by the address translation means, i.e. the FAR, and which is to be obtained in, for example, a large computer by translating a virtual address with a well-known dynamic address translation mechanism to obtain a real address and then performing a well-known prefix translation on the real address. In a system with no prefix translation, a real address itself is an absolute address.

In operation, the cache memory is a small quantity, high-speed memory capable of storing a copy of a part of a storage (e.g., main storage) in order to improve an effective speed of fetching from and storing to the storage by a host apparatus (e.g., central processing unit). If an object to be accessed during the access of the storage exists in the cache memory, the cache memory instead of the storage may be accessed. With this feature of the cache memory, the present inventors conceived that by utilizing a cache memory, relocation of a storage can be performed while the system is operating.

Specifically, in order to perform the storage relocation, data of the area of object physical addresses to be relocated is fetched into a block of the cache memory, and then new physical addresses of the storage are allocated to the absolute addresses to which the old physical addresses have been allocated. As means for modifying this allocation of addresses, heretofore an address translation means (e.g., the above-mentioned FAR) which associates an absolute address with a physical address may be utilized to modify its content dynamically.

Since before modifying the physical address, data in a source area to be relocated, namely, data in the address area which is an object for modification of physical addresses to be allocated to particular absolute addresses, is fetched into the cache memory, the read/write of the data stored in the object address area to be relocated is allowed, even during the physical address modification, by using data stored in the cache memory. During the relocation, it is unnecessary to inhibit read/write or to delay normal processes. To finalize the storage relocation, it is necessary to write the object data, which is fetched in a block of the cache memory, back to the destination address area of the storage. This write-back can be performed, according to a replacement algorithm of the cache memory, when the block has been selected to be an object for replacement. For this reason, it is preferable to employ a store-in cache memory. The store-in cache memory has a change bit, in every block, for holding information (indicating that the content has been modified) as to whether or not the content of a block is different from the content of a storage. In relocating, when the object data is fetched into a particular block, a change bit associated with that block is caused to be in a 'modified' state. After that, when the block is an object for replacement, the content of the block will be automatically written back into a new physical address area of the storage. Therefore, the relocating process terminates at the stage where data in the object address area to be relocated has been fetched in the cache memory to modify the change bit and physical addresses. Namely, active transfer of data from an old physical address area to a new physical address area, which was necessary with the prior art, will be unnecessary.

If the split storage unit, namely, a relocatable unit is larger than one block of the cache memory, the contents of plural blocks within the split storage unit are successively transferred to the cache memory. Transitionally during this relocating, even if access addresses are attributed to a split storage unit of a common absolute address area, the physical address area to be associated therewith varies depending on whether they are attributed to an unrelocated block or a relocated block. Accompanied with relocation for each and every block, the boundary of absolute address areas before and after relocation is updated successively and a decision is made regarding which side of the boundry an access address is disposed on, and an old physical address or a new physical address is selected and output according to this decision. As a consequence, even if the split storage unit is larger than the block capacity of the cache memory, it is possible to relocate the whole split storage unit.

As mentioned above, according to this invention, even during the relocation of data stored in a main storage, with the data fetched in the cache memory, it is possible to read/write with respect the area being relocated. Therefore, it is unnecessary to stop the operation of a running program during the relocation in contrast to the prior art. In addition, since the data to be relocated is transferred within a hierarchy storage system, the processing time is short.

Further, in comparison to the prior art, the function of a host apparatus utilizing a hierarchy storage system is used less frequently for the transfer of data to be relocated, and this will not prevent the original work of the host apparatus.

Even in a storage utilizing an address array of the address translation means whose allocation address unit is larger than the capacity of a cache memory block, the quantity of hardware required for the above effects is smaller in comparison to the prior method in which the capacity of the address array is increased to reduce the size of the split storage unit.

The above, and other advantages, features and additional objects of this invention will be manifested to those versed in the art upon making reference to the following detailed description and the accompanying drawings in which several preferred embodiments incorporating the principles of this invention are shown by way of illustrative example.

DETAILED DESCRIPTION

Figure 1:
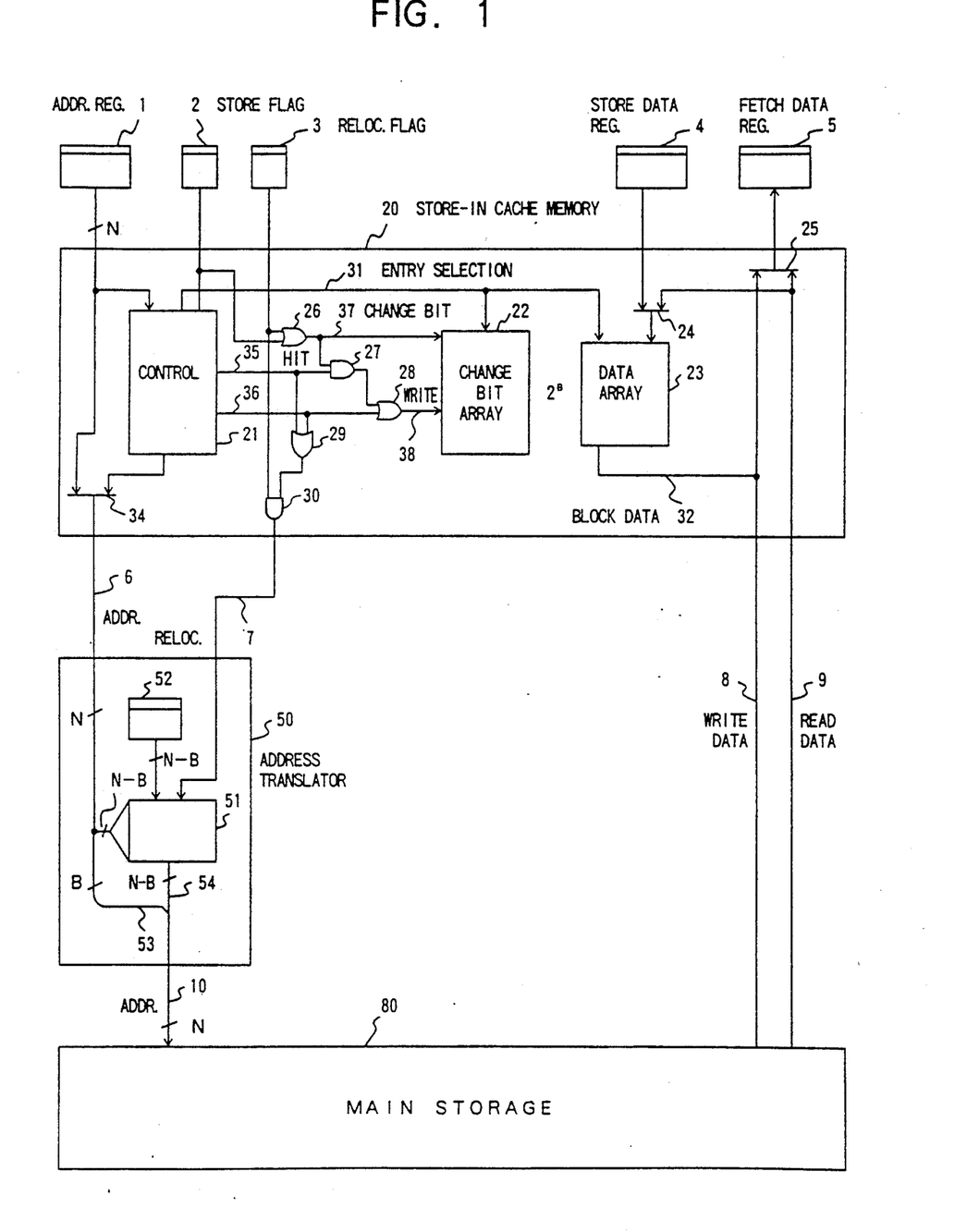
FIG. 1 is a block diagram of a hierarchy storage system according to a first embodiment of this invention.

FIG. 1 shows a hierarchy storage system according to a first embodiment of this invention. In the following description, parameters N, B and U are natural numbers.

The hierarchy storage system of the first embodiment comprises an address register 1, a store flag 2, a relocation flag 3, a store data register 4, a fetch data register 5, a store-in cache memory 20, an address translator 50 and a main storage 80.

The address register 1 is an N-bit register for setting an absolute address, the location of which a word is read from or written into. The hierarchy storage system can process three kinds of requests, i.e., a fetch request, a store request and a relocation request; the store flag 2 and the relocation flag 3 are flags for selecting one request from the above three requests. The store flag 2 is "0" in the cases of the fetch request and the relocation request, and "1" in the case of the store request. Further, the relocation flag 3 is "1" in the case of relocation request and "0" in the remaining cases. The store data register 4 is a register for setting data of words to store. Fetch data register 5 is a register for setting fetched data.

The store-in cache memory 20 includes a data array 23 for storing a plurality of blocks of energy $2^B$ words, a change bit array 22 having a plurality of entries corresponding to the entries of the data array 23, a control circuit 21 for generating control signals to constituent elements gates 26-30, and selectors 24 and 25; the store-in cache memory 20 outputs an address signal 6, a relocation signal 7 and a write data signal 8, and receives a read data signal 9 from the main storage 80.

The address translator 50 is the FAR described above, and performs address translation for every main storage split unit of the same size as the cache blocks in this embodiment, further and translates an absolute address of the address signal 6 into a physical address to give the latter, as an address signal 10, to the main storage 80. In response to the relocation signal 7, relocation of a main storage split unit is performed.

The main storage 80 has a storage capacity of $2^N$ words, outputs as a read data signal 9 data of the block designated by the address signal 10, during reading, and stores data of a write data signal in the block designated by the address signal 10 during storing.

In the data array 23, if block data stored in an entry is different from data of the corresponding block in the main storage 80, the entry of the change bit array 22 associated with the block will be "1". If it is equal, that entry will be "0". Storing into the change bit array 22 is controlled by the change bit signal 37 and the write signal 38. If the write signal 38 is turned to "1", the value of the change bit signal 37 will be stored in the entry designated by an entry selection signal 31. The control circuit 21 holds absolute addresses of the blocks stored in every entry of the data array. The entry selection signal 31 selects an entry of the data array 23 and the change bit array 22. The data array 23 allows reading/writing of block data corresponding to the block stored in the entry designated by the entry selection signal 31, and also allows reading/writing of a word in the block. The selector 24 selects data to be stored into the data array 23. The selector 25 we selects data to be inputted to the fetch data register 5. An OR gate 26, an AND gate 27 and an OR gate 28 jointly constitute a circuit for controlling the updating of the change bit array 22.

An OR gate 29 and an AND gate 30 control relocation process in an address translator 50. Some constituent elements of the store-in cache memory 20 which are unnecessary to describe this embodiment are omitted here for clarity.

The address translator 50 includes an address array 51 and a physical address register 52. The address array 51 is a RAM for storing address allocation information in every entry, with upper (N − B) bits of the absolute address applied as an accessing address. The physical address register 52 stores address allocation information to be given to a main storage split unit after relocation. The main storage split unit is a minimal unit of the main storage which is relocatable by the address translator 50.

The address allocation information is upper (N B) bits of a physical address. The physical address can be obtained by joining the address allocation information with the lower B bit of the absolute address.

Further, assuming that the value of the relocation signal 7 is turned to "1", the content of the physical address register 52 is stored into the entry of the address array 51 designated by the address signal 6, so that it is possible to modify location of the corresponding main storage split unit. This address translating action itself is known in association with FAR, but the address translator 50 has an additional function for updating the entry according to the physical address register 52 and the relocation signal 7.

Figure 3A:
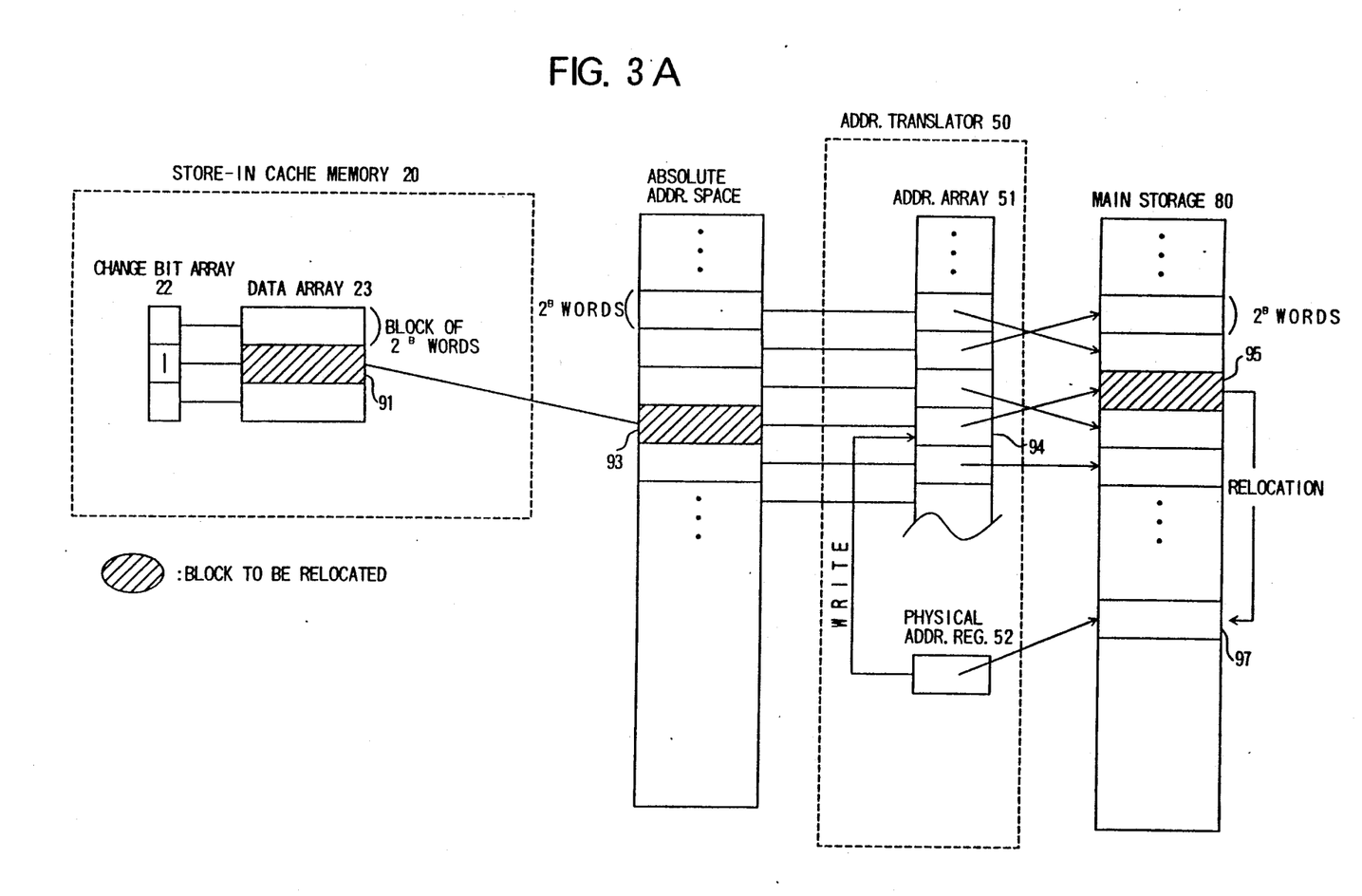
FIG. 3A is a diagram showing the relation between an absolute address space and a physical address space of a main storage in the first embodiment.

The association between the data array 23, the main storage split unit, the address array 5, the main storage 80, etc. in this embodiment is shown in FIG. 3A. The entry number of the data array 23 is "3" in FIG. 3A for simplified illustration, but actually for other reasons, as well. In FIG. 3A, for example, one block 91 of the data array 23 is associated with one block 93 of the absolute address space, and this block 91 is in turn associated with a block 95 of the main storage 80 via the address translator 50. When the block 93 of the absolute address space is to be relocated from the block of the main storage 80 into a block 97, the data of the block 95 is read into one block 91 of the cache memory 20, while causing the corresponding change bit to be "1". Also, the content of the entry 94 of the address array 51 in the address translator 50, which entry is corresponding to the block 93 of the absolute address, is rewritten in a physical address associated with a new block 97, and thus relocation has been achieved. Subsequently, when the block 91 of the cache memory 20 is selected as an object for replacement, the data of block 91 is written back to the block 97 of the main storage 80 rather than block 95.

Three request processes, i.e., the fetch request, store request and relocation request will be described.

First, block fetching process to be performed commonly in these three requests will be described. Then fetch process, store process and relocation process will be described. The three processes, i.e. the block fetching process, fetch process and store process jointly constitute an algorithm of a so-called store-in cache.

(1) Block Fetching Process

Figure 4A:
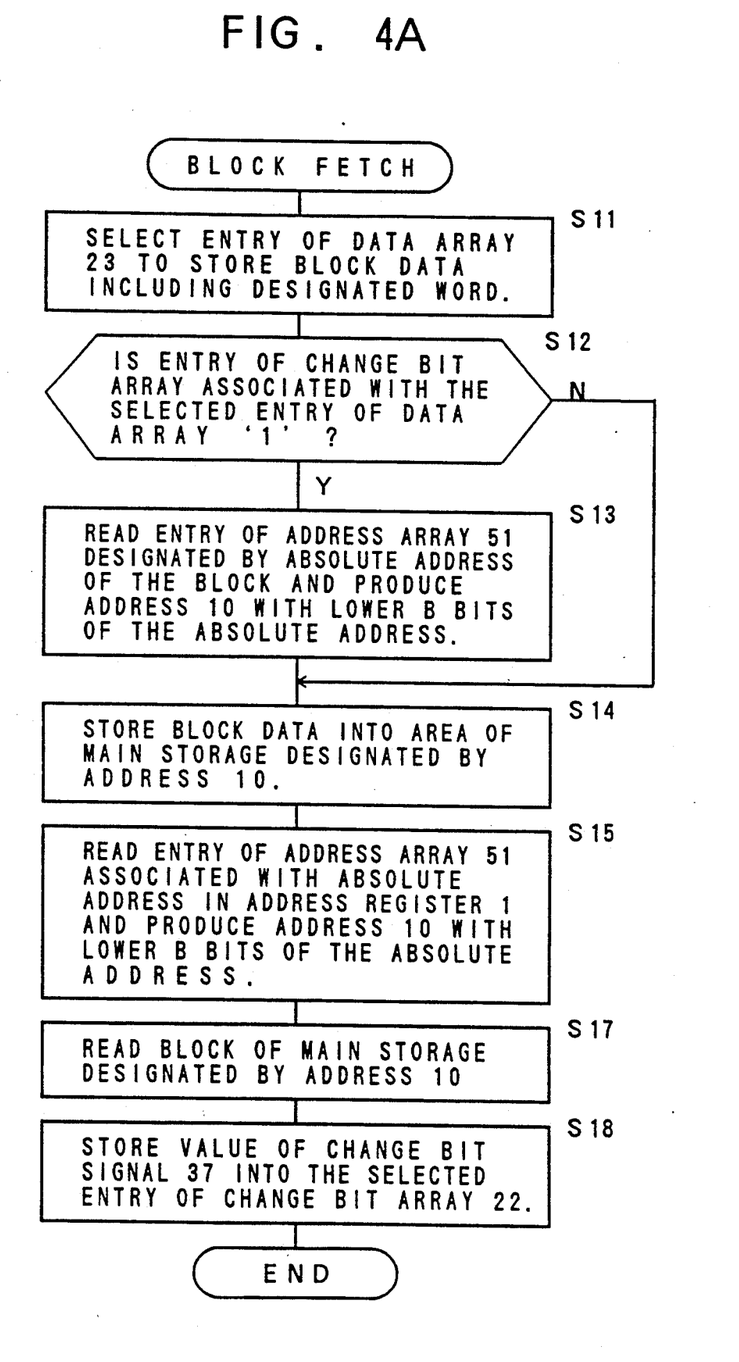
FIGS. 4A through 4D are flow diagrams respectively showing various processes of the first embodiment.

FIG. 4A is a flow diagram of the block fetching process. When block fetching is to be performed, the control circuit 21 selects a suitable entry of the data array 23 (S11) in order to store the block to be fetched, and examines (S12) whether or not the entry of the change bit array 22 corresponding to the selected entry is "1". If the entry is "1", block write-back action is performed to save the block data stored in the entry. The block write-back action applies an absolute address associated with the block to the address translator 50 via the selector 34, translates the absolute address into a physical address by the address translator 50, and sends the physical address to the main storage 80 (S13). After data of the block is read from the data array 23 and is sent as a write data signal 8 to the main storage 80, a store instruction is given to the main storage 80 to write the block data back to the main storage 80 (S14).

Then, the selector 34 selects the output of the address register I to output the same output as an address signal 6 while control circuit 21 instructs the main storage 80 to read the block. Thereafter, the entry of the address array 51, which entry is associated with the absolute address stored in the address register 1, is read and is output as an address signal 10 along with an lower B bits of the absolute address (S 15). The block in the main storage 80 which block is designated by this address signal 10 is read as read data (S 16). The data obtained as a read data signal 9 from the main storage 80 is stored, via the selector 24, in the selected entry of the data array 23 (S17).

When all data of the block are stored in the selected entry, the control circuit 21 causes the fetch completion signal 36 to be "1". By the action of the OR gate 28, the write signal 38 will be "1." The change bit array 22 stores (S18) the value of the change bit signal 37 in the entry selected by the entry selection signal 31. The value of the change bit signal 37 varies depending on the request to be processed. Thus the block fetch process has been completed.

(2) Fetching Process

Figure 4B:
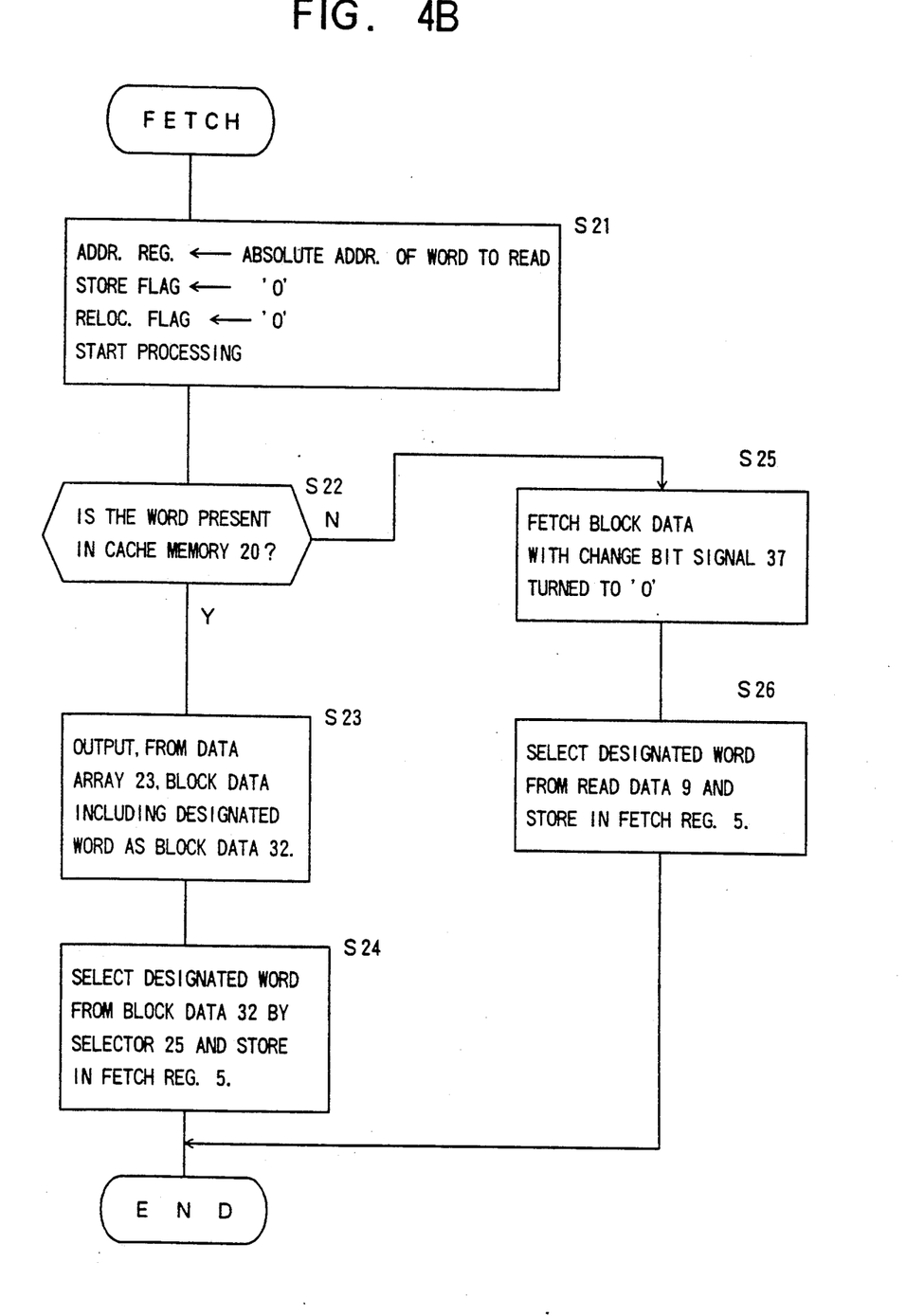

FIG. 4B is a flow diagram of fetching process. The fetch request sets, in the address register 1, an absolute address of the word to be read and also sets "0" both in the store flag 2 and the relocation flag 3, whereupon an operation instruction issues to start the fetch request process (S21).

Then, examination is made (S22) on whether or not the data of the word designated by the address register I is stored in the store-in cache memory 20. If stored, the control circuit 21 outputs the entry selection signal 31 which, designates the entry including the data with a hit signal 35 as "1". The data array 23 then outputs as the block data signal 32 data of the block designated by the entry selection signal 31 (S23). Selector 25 selects, from the block data signal 32, data of the word designated by the address register 1, and stores the selected data in the fetch data register 5 (S24).

If not stored in the step S22, the above-described block fetch process is performed (S25). The selector 25 selects, from the block data obtained as the read data signal 9, data of the word designated by the address register 1, and stores the selected data in the fetch data register 5 (S26). Further, since both the store flag 2 and the relocation flag 3 are "0", the change bit signal 37 is "0". Accordingly, as the result of the block fetch process, "0" is stored into the entry of the change bit array 22 whose corresponding entry of the data array has load the block data, thus memorizing that the content of the block stored in the store-in cache memory 20 coincides with the content of the block stored in the main storage. Thus the fetching process has been completed.

(3) Store Process

Figure 4C:
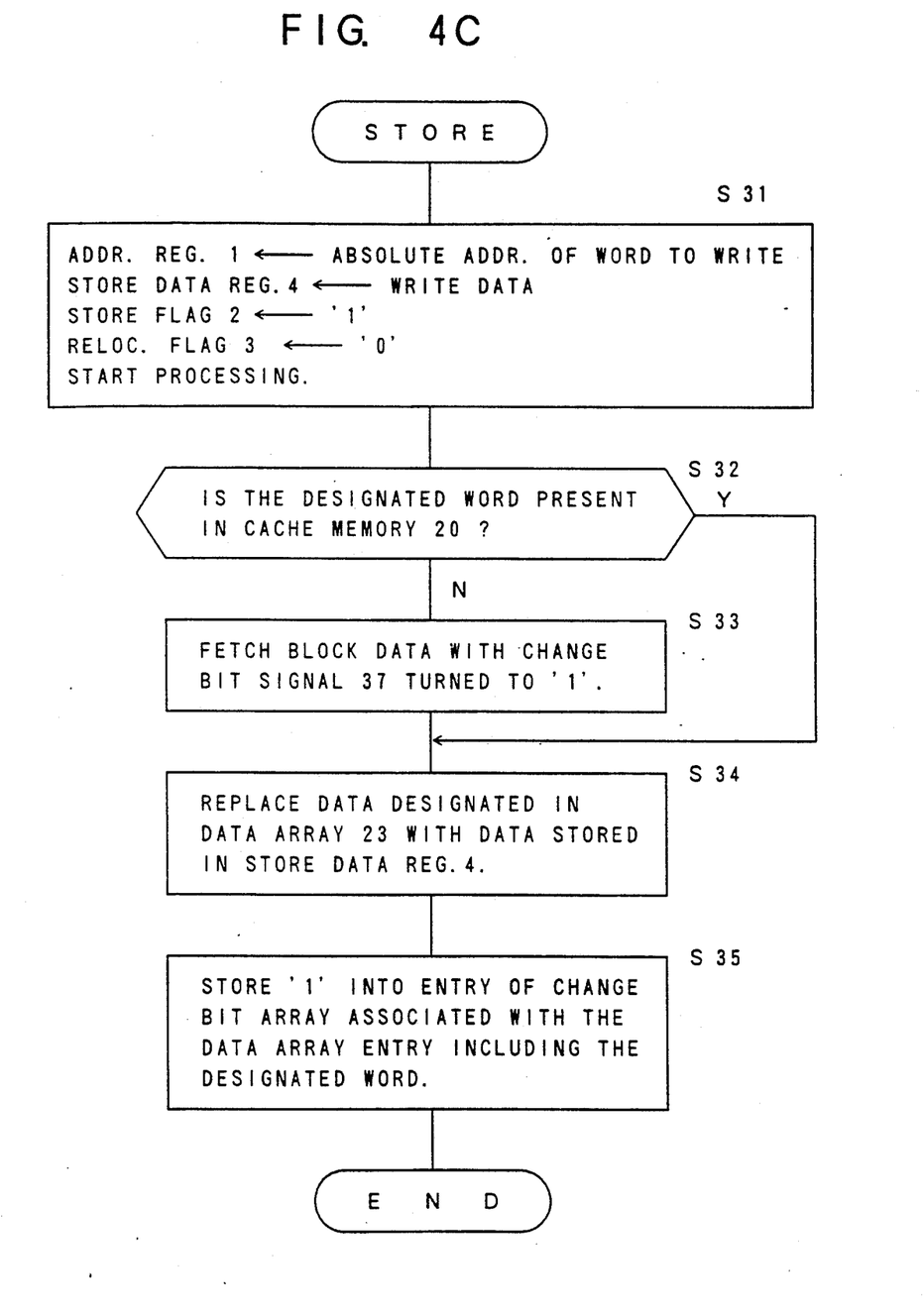

FIG. 4C is a flow diagram of the store process. The store request sets, in the address register 1, an absolute address of the word to be read, and also sets the stored data in the store data register 4 and sets "1" and "0" in the store flag 2 and the relocation flag 3, respectively, whereupon an operation instruction is issued to start the store process (S31).

Then, examination is made (S32) on whether or not the data of the word designated by the address register 1 is stored in the store-in cache memory 20. If stored, the control circuit 21 outputs as the entry selection signal 31 a signal which designates the entry in which the data is stored, and also outputs "1" as the hit signal 35. The selector 24 selects the output of the store data register 4 and sends the selected output to the data array 23. As mentioned above, data of the word designated by the address register 1 is included in the block stored in the entry designated by the entry selection signal 31, and the data array 23 replaces the data with data output by the selector 24 (S34). Meanwhile, by the action of OR gate 26, the change bit signal 37 will be "1", and both the AND gate 27 and the OR gate 28 will serve to turn a write signal 38 to "1". Therefore "1" is stored in the entry designated by the entry selection signal 31 of the change bit array 22 (S35). Thus, the store process has been completed.

At the step 32, if the data of the word designated by the address register 1 is not stored in the store-in cache memory 20, the above-described block fetch process will be performed (S33). At that time, since the content of the store flag 2 is "1", the value of the change bit signal 37 will be "1" by the action of the OR gate 26.

As the result of the block fetch process, "1" is stored in the entry of the change bit array 22, at the data array entry corresponding to which data storing is performed, whereupon the same process is performed as the case in which the designated word is stored in the store-in cache memory 20, thereby completing the store process.

(4) Relocation process

Figure 4D:
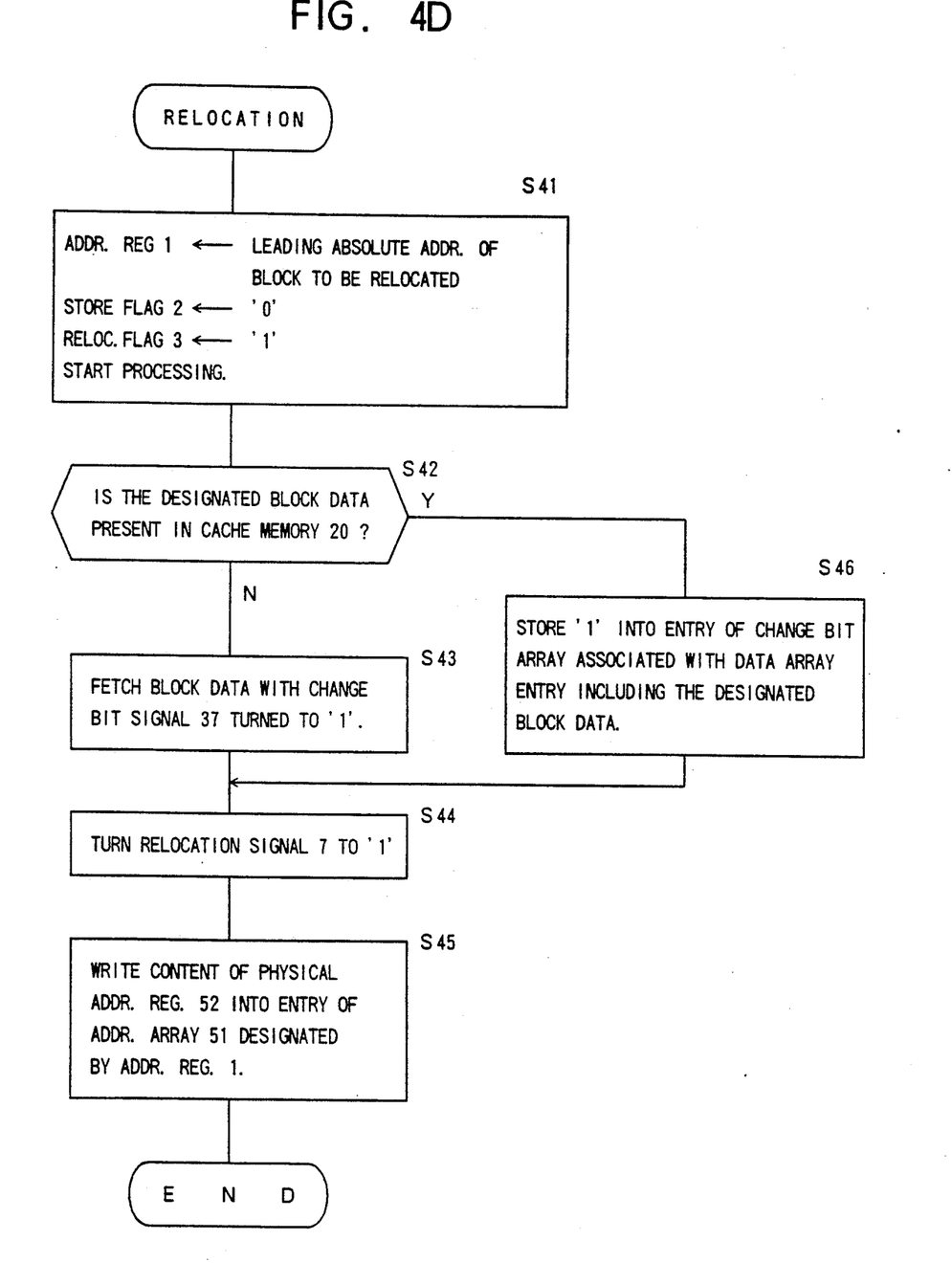

FIG. 4D is a flow diagram of relocation process. The relocation request sets, in the address register 1, a leading or first address of the block to be relocated, and also sets "0" and "1" in the store flag 2 and the relocation flag 3, respectively, whereupon an operation instruction is issued to start the relocation process (S41). Subsequently, examination is made (S42) on whether or not data of the word designated by the address register 1 is stored in the store-in cache memory 20. If stored, the control circuit 21 outputs as the entry selection signal 31 a signal which designates the entry in which the data is stored and also outputs "1" as the hit signal 35. Further, since the content of relocation flag is "1", the value of the change bit signal 37 will be "1" by the action of the OR gate 26. Meanwhile, since both the values of the hit signal 35 and the change bit signal 37 are "1", the write signal 38 will be "1" by the action of the AND gate 27 and the OR gate 28 so that "1" will be stored in the entry designated by the entry selection signal 31 of the change bit array 22 (S46). At that time, the relocation signal 7 is turned to "1" by the action of the OR gate 29 and the AND gate 30 (S44). When the relocation signal 7 becomes "1", address array 51 stores the content of the physical address register 52 into the entry of the address array 51 designated by address signal 6 (S45). As a result, the block designated by the address register I will be relocated.

Meanwhile, at step 42, if the data of the word designated by the address register I is not stored in the store-in cache memory 20, the above-described block fetch process will be performed (S43). At that time, since the content of the relocation flag 3 is "1", the value of the change bit signal 37 will be "1" by the action of the OR gate 26. As the result of the above-described block fetch "1" will be stored in the entry designated by the entry selection signal 31 of the change bit array 22. Further, since the fetch completion signal 36 in the block fetch process will be "1", the relocation signal 7 will be turned to "1" by the action of the OR gate 29 and the AND gate 30 (S44). The address array 51 then stores the content of the physical address register 52 into the entry of the address array 51 which entry is designated by the address signal 6 (S45). As a result, the block designated by the address register 1 will be relocated. The hatched portion in FIG. 3A represents a target block to be relocated when the relocation signal 7 is "1".

In the foregoing relocation process, storing into the main storage of the relocated block is not performed, still leaving meaningless data in the corresponding block on the main storage 80. However, because the change bit corresponding to the block is "1", the block stored in the store-in cache memory is regarded as the only correct data, and the data in the main storage 80 is disregarded, according to the algorithm of the store-in cache, producing no contradiction.

There is no restriction to the relation between an area before having been modified and an area after having been modified; that is, there may be overlapping of the areas.

Figure 2:
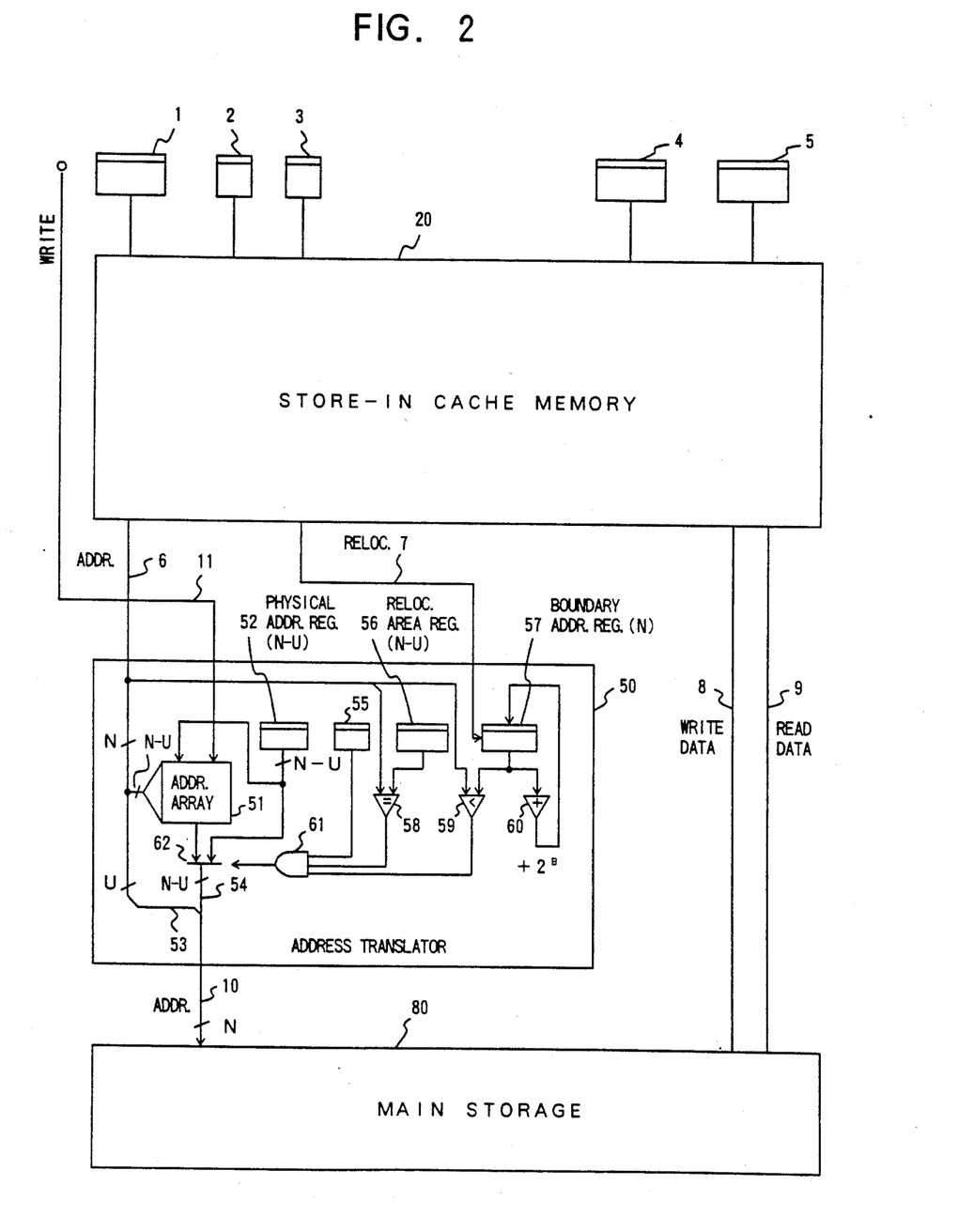
FIG. 2 is a block diagram of another hierarchy storage system according to a second embodiment.

FIG. 2 shows a modified hierarchy storage system according to a second embodiment of the present invention, which is identical in construction to the first embodiment, except for an address translator 50.

Various constituent elements of the address translator 50 will now be described. In this embodiment, the size of the main storage split unit is $2^U$ words, namely, $U>B$. Therefore, the main storage split unit includes $2^{(U-B)}$ blocks. Further, address allocation information is an upper $(N-U)$ bit of the physical address, and the physical address can be obtained by joining the address allocation information of $(N-U)$ bits with the lower U bits of the absolute address.

The address array 51 is a RAM for storing address allocation information in every entry thereof, with the upper $(N-U)$ bits of the absolute address applied as an address, and is equivalent to the conventional FAR, like the first embodiment. A relocation area register 56 stores upper $(N-U)$ bits of a leading absolute address of the main storage split unit to be relocated. The physical address register 52 stores address allocation information to be given after the main storage split unit designated by the relocation area register 56 has been relocated; that is, the physical address register 52 stores the upper $(N-U)$ bits of the physical address. A boundary address register 57 stores a boundary address of N bits, and sets the output of a boundary address adder 60 in response to the instruction of the relocation signal 7. A comparator 58 compares the upper $(N-U)$ bits of the content of the address register 1 with the relocation area register 56, outputs "1" if their values are the same, and outputs "0" if their values are different. A comparator 59 compares the content of the address register 1 with the content of the boundary address register 57, outputs "1" if the access address is smaller than the boundary address, and otherwise outputs "0". The boundary address adder 60 outputs an absolute address which is the boundary address added with $2^B$. The selector 62 is a selection circuit for selecting the output of the address array 51 if the output of the AND gate 61 is "0" and for selecting the output of the physical address register 52 when the output of the AND gate 61 is "1". The valid bit 55 is a flag indicating that the address translator 50 is in a relocation execution mode. If the content of the valid bit 55 is "1", it is the relocation mode; if the content is "0", it is not the relocation mode.

Further, the write signal 11 is a signal which designates storing in the address array 51. If the value is "1", the content of the physical address register 52 will be stored in the entry of the address array 51 which entry is designated by the address signal 6.

Figure 3B:
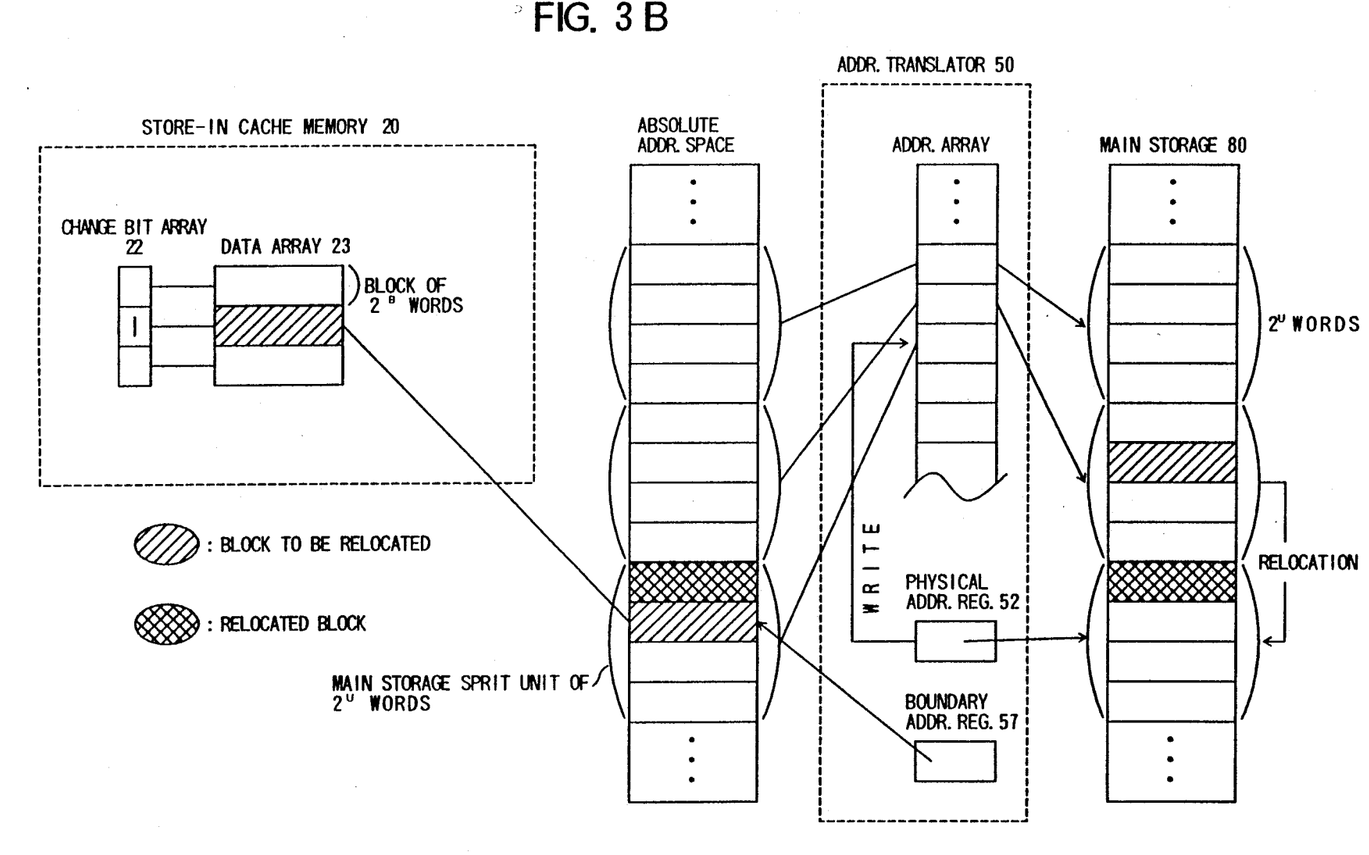
FIG. 3B is a diagram similar to FIG. 3A, showing the relation between an absolute address space and a physical address space of a main storage in the second embodiment.

The relationships between the data array, the main storage split unit, the address array, the storage 80, etc. in the second embodiment is shown in FIG. 3B. Also in FIG. 3B, the entry number of the data array 23 is only "3" for clarity. In this embodiment, it is intended that one block ($2^B$ words) of the cache memory 20 is smaller than the main storage split units ($2^U$ words). However, because relocation by the cache memory 20 can be performed only in block unit, it is impossible to relocate one split unit of the main storage 80 at one time. Therefore, in relocation of one split unit of the main storage 80, plural blocks included in the split unit will be relocated successively in a block by block basis. During this relocating, blocks having been previously relocated and other blocks after having been subsequently relocated exist temporarily in the same main storage split unit.

In other words, even in the same absolute address area, the original physical address must be adapted for the unrelocated blocks, and a new physical address must be adapted for the relocated blocks. The address translator 50 of FIG. 2 can cope with this requirement.

In operation, if relocation is not to be performed, since the, valid bit 55 is "0", only the address allocation information output from the address array 51 by the AND gate 61 and the selector 62 can be used for address translation.

Then while relocation is being executed, since the valid bit 55 is "1", if the content of the address register 1 is included, in the main storage split unit designated by the relocation area register 56 and if the content of the address register 1 is smaller than the boundary address, the output of the physical address register 52 is used for address translation, and otherwise, the output of the address array 51 is used for address translation by the action of the comparator 58, the comparator 59, the AND gate 61 and the , selector 62. Thus when the valid bit is "1", the storage unit of address allocation is divided into two halves at the boundary address so that different physical addresses can be allocated to the respective halves of the storage unit of address allocation.

With the relocation signal 7 of "1", the content of the boundary address register 57 is increased by the size of the block, while the physical address of the block, which had been designated by the boundary address before increasing, will be modified from that designated by the address array 51 to that designated by the physical address register 52. This modification is equivalent to the modification of the physical address made in response to the relocation signal 7 in the relocation process of the first embodiment. Allocation of a physical address to an absolute address of the main storage split unit complies with the output of the address array 51 if the boundary address is at the frontmost of the main storage split unit, and complies with the output of the physical address register 52 if the boundary address is larger than the maximal absolute address of the main storage split unit. The hierarchy storage system of this embodiment, like the first embodiment, can execute three requests, i.e., a fetch request, a store request and a relocation request. The processes for the fetch and store requests are identical with those of the first embodiment, and hence its description is omitted here for clarity. The relocation request is to relocate one block like the first embodiment; however, the relocation request is used only as one step of the whole relocation process of the main storage split unit, and consequently, the relocation process will be described in the description of the relocation process.

Figure 5A:
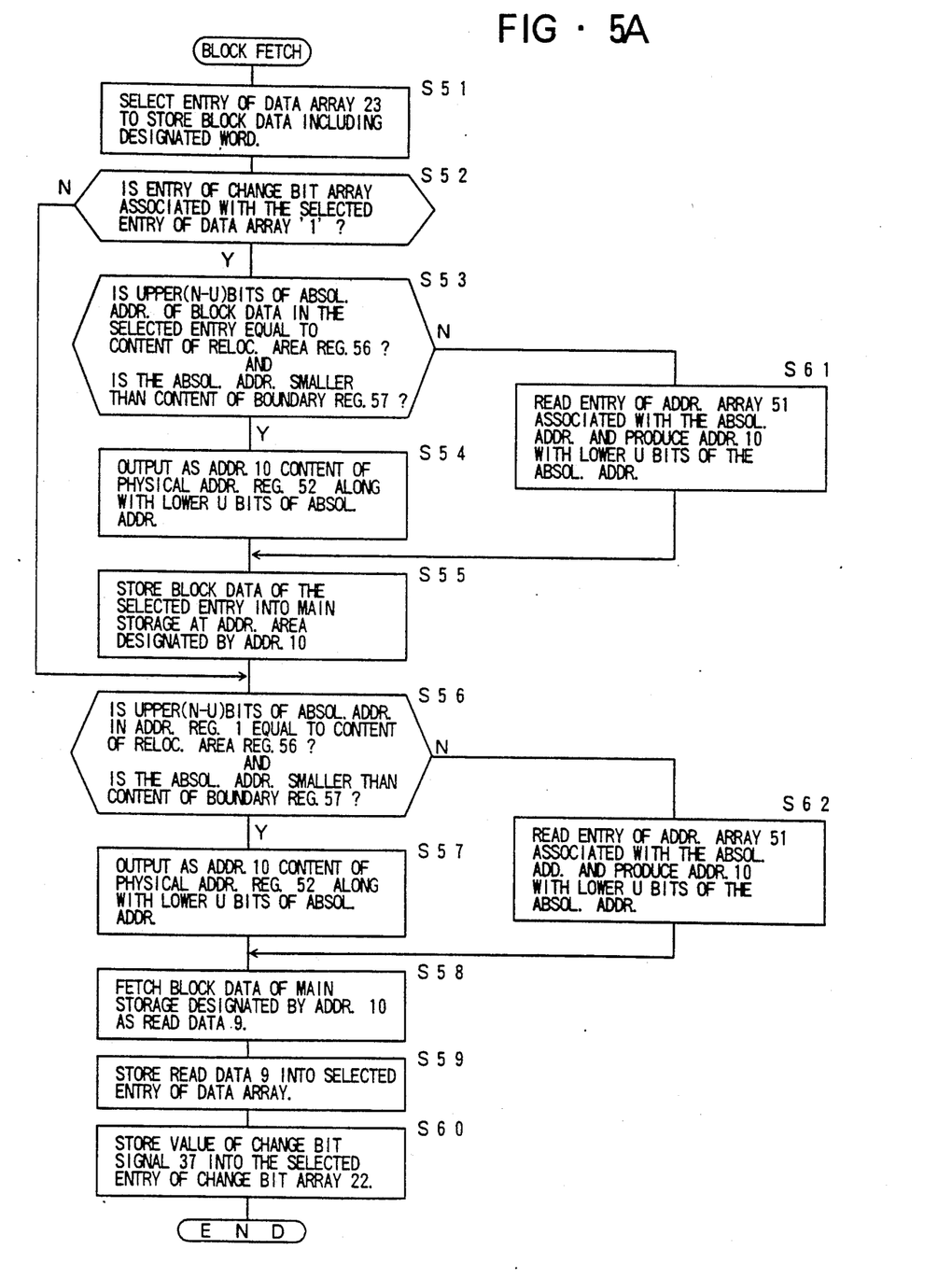
FIGS. 5A and 5B are flow diagrams respectively showing two processes of the second embodiment.

FIG. 5A is a flow diagram of a block fetch process. In the block fetch process, first the entry of the data address 23 is suitably selected to store the block including the designated word (S51). Then examination is made (S52) as to whether or not the entry of the change bit array 22 is "1", the entry corresponding to the selected entry. If "1", this means that the content has been modified; therefore it is necessary to write back to the main storage. To this end, examination is made (S53) as to whether or not the upper (N−U) bits of the absolute address of the block stored in the selected entry are equal to the content of the relocation area register 56, and as to whether or not the absolute address is smaller than the content of the boundary register 57. At this step, in other words, examination is made as to whether or not the block is attributed to the relocated one. If the result is positive, the content of the physical address register 52 is output as an address signal 10 along with the lower U bits of the absolute address (S54). If the result is negative, the entry of the address array 51 corresponding to the absolute address is read, and the read-out data is output as an address signal 10 along with the lower U bits of the absolute address (S61). Then, data of the block is written back to the address of the main storage 80 which is to be designated by the address signal 10 (S55). If at step 52, the entry of the change bit array 22 is "0", the content of the block has no change and therefore steps S52-S55 and S61 for writing back are omitted.

Then, examination is made (S56) as to whether or not the upper (N−U) bits of the absolute address stored in the address register 1 are, equal to the content of the relocation area register 56 and also as to whether or not the absolute address is smaller than that in the boundary register 57. This step corresponds to the step 53. If the result is positive, the content of the physical address register 52 is output as an address signal 10 along with the lower U bits of the absolute address (S57). If the result is negative, the entry of the address array 51 corresponding to the absolute address will be read, and data of the entry will be output as an address signal 10 along with the lower U bits of the absolute address. Then, the in the main storage 80 which block is designated by the address signal 10 will be read as a read data signal 9 (S58). The data of the read data signal 9 is stored in the selected entry of the data array (S59), and the value of the change bit signal 37 is stored in the selected entry of the change bit array 22 (S60). Thus the block fetch process has been completed.

Figure 5B:
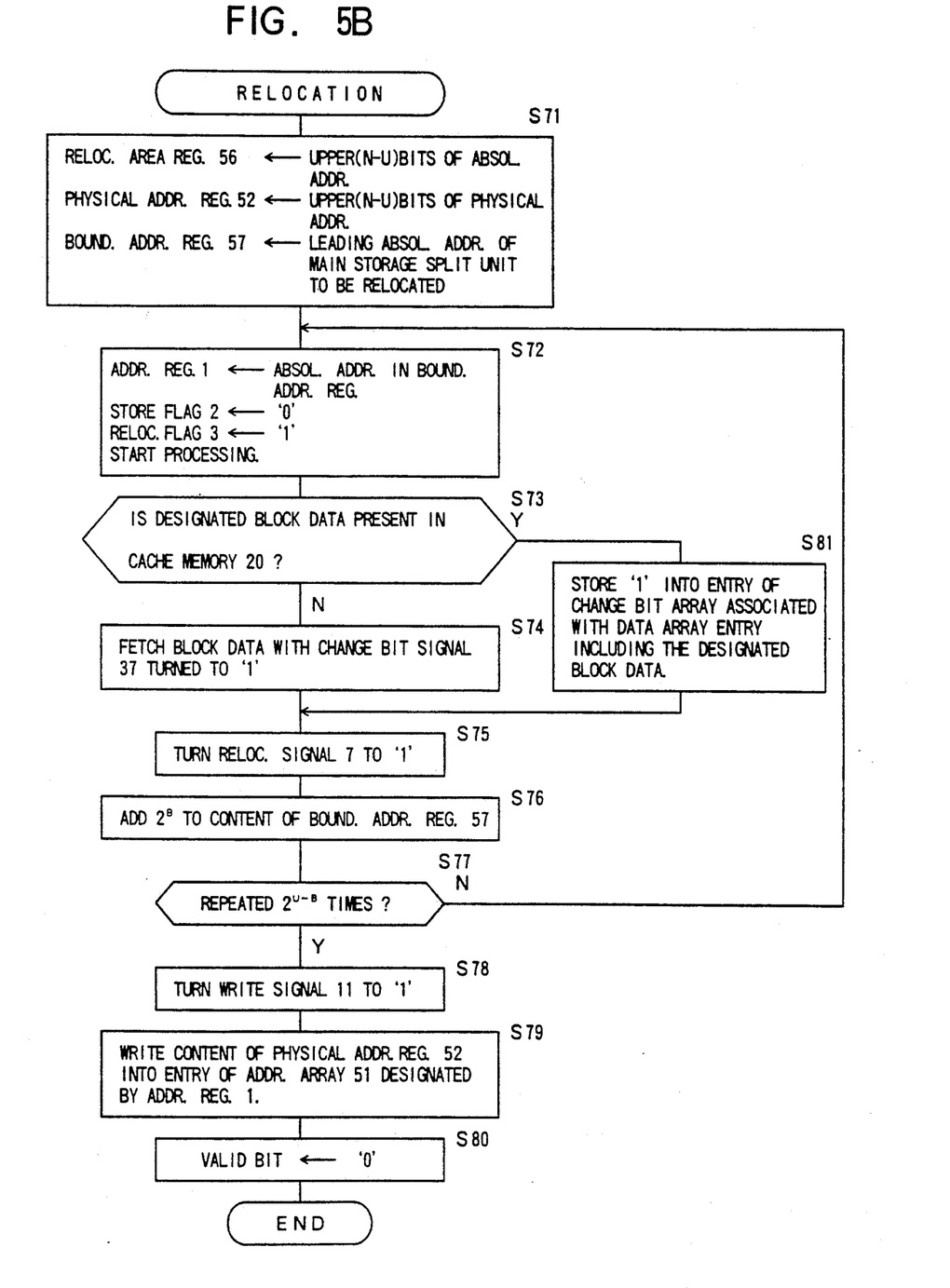

The relocation process of main storage split unit according to the second embodiment will now be described. This relocation process will be performed by executing the following procedures 1) to 7) successively by a processing apparatus utilizing the hierarchy storage system. FIG. 5B is a flow diagram of the relocation process.

In the relocation process, relocation of the main storage split unit composed of plural blocks is performed by repeating the relocation of one block by a relocation request.

1) The upper (N−U) bits of the absolute address of the main storage split unit to be relocated are set in the relocation area register 56.

2) The upper (N−U) bits of the physical address, in which the main storage split unit is newly located, are set in the physical address register 52.

3) The leading absolute address of the main storage split unit to be relocated is set in the boundary address register 57.

4) The valid bit 55 is made to be "1". (foregoing procedures 1) through 4): S71).

5) The following relocation request process is repeated $2^{(U-B)}$ times. (S72-S77 and S81).

The absolute address equal to that held in the boundary address register 57 is set in the address register 1, the store flag 2 is set to "0", and the relocation flag 3 is set to "1", thereby starting the hierarchy storage system.

6) The write signal 11 is made to be "1" (S78), in response to which the content of the physical register 52 is stored in the entry designated by the address register 1 (S79).

7) The valid bit is turned to be "0" (S80). The procedures 1) through 4) are initialization of the registers to be used in the relocation apparatus. For the blocks constituting a main storage split unit designated by the relocation area register 56, the procedure 5) repeats the relocation process discussed in connection with the first embodiment, and relocates all blocks in the main storage split unit in the physical address designated by the physical address register 52. In relocation process of each block, the store-in cache memory 20 takes the same action as relocation request process discussed above in connection with the first embodiment. The relocation signal 7 increases the content of the boundary address register 57, instead of reloading the entry of the address array 51. However, the result with this embodiment is similar to that of the first embodiment.

The procedure 6) stores the content of the physical address register 52 in the address array 51 designated by the address signal 6, and reflects the relocation, which is achieved by the procedure 5), in the address array 51. Since by this process, the content of the address array 51 coincides with the content of the physical address register 52, the valid bit 55 can be turned to "0".

The process 7) releases registers for relocation included in the address translator 50, and enables relocation of another main storage split unit.

In the first embodiment, the size of the main storage split unit is the same as the block size of the cache. This invention should by no means be limited to this specific example. For example, this invention may be otherwise adapted, like the second embodiment, provided that the size of the main storage split unit is an integer times as large as the block and is smaller than the capacity of the store-in cache memory.

Although in the first and second embodiments, the address allocation information is upper bits of the physical address, any information may be used if it associates the absolute addresses within the main storage split unit with the physical addresses of the main storage in a one-to-one relationship. For example, if the main storage split unit is interleaved in the main storage, data may include the information designating an interleave pattern.

Further, the main storage split unit is constant in size in the first and second embodiment. However, the size of the main storage split unit may vary.

In the second embodiment, the blocks within the main storage split are stored in the cache memory in ascending order of address. Other orders may be possible, if the comparator 59 and the boundary address adder 60 are arranged to comply with that order.

Also the second embodiment utilizes the valid bit. If the relocation area register 56 and the boundary register 57 are "0", it is possible to achieve the same result as valid bit=0. Therefore the valid bit is not an essential factor.

According to this invention, even while the relocation of data stored in the main storage is being executed, it is possible to read/write with respect to the area being relocated, by using data stored in a cache memory. Therefore, it is unnecessary to stop the running of the program temporarily for relocation, and hence is possible to perform relocation of the main storage while the system is operating.

What is claimed is:

1. A hierarchy storage system, comprising:
   a storage;
   an address translation table for translating an absolute address into a physical address for a predetermined split storage unit of said storage;
   a store-in cache memory including a data array composed of plural blocks for storing a part of a data content stored in said storage, and a change bit array for storing change bits, each of said change bits indicating that data stored in a block of said data array is different from data of a corresponding part of said storage, said predetermined split storage unit having a larger capacity than said block of said cache memory data array;
   first address holding means for holding physical address data of an object predetermined split storage block to be relocated;
   second address holding means for holding absolute address information of object predetermined split storage block to be relocated;
   third address holding means for holding boundary absolute address for an un-relocated block and said object predetermined split storage block to be relocated;
   boundary address updating means for updating one block of said boundary absolute address of said third address holding means for every block relocation;
   first determining means for determining whether said absolute address information stored in said second address holding means corresponds to said object predetermined split storage unit to be relocated;
   second determining means for determining a physical comparison between an new absolute address and said boundary absolute address;
   selecting means for selecting either of, according to a determined results of said first and second determining means, physical address information from said address translation table and said physical address data from said first address holding means to give a selected one to said storage; and
   writing means for writing the physical address data content of said first address holding means into a corresponding portion of said address translation table after all blocks in said object split storage unit have been relocated.

* * * * *